(12) United States Patent
Liao et al.

(10) Patent No.: US 10,788,740 B2
(45) Date of Patent: Sep. 29, 2020

(54) PROJECTOR, ILLUMINATION SYSTEM, AND WAVELENGTH CONVERSION DEVICE

(71) Applicant: Coretronic Corporation, Hsin-Chu (TW)

(72) Inventors: Chien-Chung Liao, Hsin-Chu (TW); Jen-Hung Huang, Hsin-Chu (TW); Kuan-Ta Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/993,416

(22) Filed: May 30, 2018

(65) Prior Publication Data

US 2018/0348613 A1 Dec. 6, 2018

(30) Foreign Application Priority Data

Jun. 2, 2017 (CN) .......................... 2017 1 0408890

(51) Int. Cl.
*G03B 21/20* (2006.01)

(52) U.S. Cl.
CPC ......... *G03B 21/204* (2013.01); *G03B 21/208* (2013.01); *G03B 21/2066* (2013.01)

(58) Field of Classification Search
CPC . G03B 21/204; G03B 21/208; G03B 21/2066
See application file for complete search history.

(56) References Cited

U.S. PATENT DOCUMENTS

| | | | |
|---|---|---|---|
| 2010/0328617 A1 | 12/2010 | Masuda | |
| 2011/0116253 A1* | 5/2011 | Sugiyama | F21S 10/007 362/84 |
| 2012/0206900 A1* | 8/2012 | Yang | G02B 19/0028 362/84 |
| 2013/0100644 A1 | 4/2013 | Hu et al. | |
| 2013/0301237 A1* | 11/2013 | Finsterbusch | G03B 21/204 362/84 |
| 2014/0240677 A1 | 8/2014 | Hu et al. | |

FOREIGN PATENT DOCUMENTS

| | | |
|---|---|---|
| CN | 102636946 A | 8/2012 |
| CN | 102650814 A | 8/2012 |
| CN | 102914939 A | 2/2013 |

(Continued)

*Primary Examiner* — Michelle M Iacoletti
*Assistant Examiner* — Danell L Owens

(57) ABSTRACT

A projector and its illumination system and wavelength conversion device are provided. The wavelength conversion device includes a substrate, a wavelength converting portion, and a wavelength maintaining portion. The substrate has a rotation axis. The wavelength converting portion surrounds the rotation axis and is adapted to receive the first beam and convert a first portion of the first beam into a second beam. The wavelength maintaining portion surrounds the rotation axis and is adapted to receive the first beam and guide a second portion of the first beam. A ratio of the first portion of the first beam with respect to the first beam is greater than a ratio of the second portion of the first beam with respect to the first beam. The illumination system and the wavelength conversion device in the projector reduce the number of optical elements, thereby reducing the cost and the size of the projector.

43 Claims, 10 Drawing Sheets

(56) References Cited

FOREIGN PATENT DOCUMENTS

| | | | |
|---|---|---|---|
| CN | 103403596 | A | 11/2013 |
| CN | 103792768 | A | 5/2014 |
| CN | 105301880 | A | 2/2016 |
| JP | 2011133784 | A | 7/2011 |
| JP | 2015184407 | A | 10/2015 |

* cited by examiner

PROJECTOR, ILLUMINATION SYSTEM, AND WAVELENGTH CONVERSION DEVICE

CROSS-REFERENCE TO RELATED APPLICATION

THIS APPLICATION CLAIMS THE PRIORITY BENEFIT OF CHINA APPLICATION (CN201710408890.3 FILED ON 2017 Jun. 2). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a wavelength conversion device, and more particularly to a wavelength conversion device for a projector and an illumination system.

BACKGROUND OF THE INVENTION

A digital light processing (DLP) projection device includes an illumination system, a light valve and a projection lens. The illumination system is used to provide an illumination beam, the light valve is used to convert the illumination beam into an image beam, and the projection lens is used to project the image beam onto a screen to form an image on the screen. With the development of illumination technology, the illumination system of projector gradually uses light emitting diode light source or laser light source with power saving advantage.

However, the current projector's illumination system must use a lot of optical components to guide the transmission of the illumination beam, therefore, in addition to leading to problems such as complicated optical path of beam and reduced optical efficiency of projector, the problems such as high cost, large size and the generation of noise also occur. Therefore, how to improve the above-mentioned problems is the focus of attention of the persons in the field of the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a projector having the advantage of lower cost and smaller size.

Another objective of the invention is to provide an illumination system disposed in a projector to reduce the number of optical elements, thereby reducing cost and size.

Still another objective of the invention is to provide a wavelength conversion device disposed in an illumination system to reduce the number of optical elements, thereby reducing the cost and size of the illumination system.

Other objectives and advantages of the invention will become apparent from the technical features disclosed in the invention.

To achieve one or a portion or all of the above objectives or other objectives, the invention provides a projector including an illumination system, a light valve, and a lens. The illumination system includes a light source device, a wavelength conversion device, and a light combining element. The light source device is adapted to provide a first beam. The wavelength conversion device is disposed on a transmission path of the first beam. The wavelength conversion device includes a substrate, a wavelength converting portion, and a wavelength maintaining portion. The substrate has a rotation axis. The wavelength converting portion surrounds the rotation axis of the substrate, and is adapted to receive the first beam and convert a first portion of the first beam into a second beam. The wavelength maintaining portion surrounds the rotation axis of the substrate, and is adapted to receive the first beam and guide a second portion of the first beam. A ratio of the first portion of the first beam with respect to the first beam is greater than a ratio of the second portion of the first beam with respect to the first beam. The light combining element is disposed on the transmission path of the first beam between the light source device and the wavelength conversion device. The first beam emitted from the light source device is transmitted to the wavelength conversion device by the light combining element. The light combining element is disposed on a transmission path of the second beam from the wavelength converting portion and the second portion of the first beam from the wavelength maintaining portion, so that the second portion of the first beam and the second beam form an illumination beam. The light valve is disposed on a transmission path of the illumination beam, and adapted to convert the illumination beam into an image beam. The lens is disposed on a transmission path of the image beam, and adapted to convert the image beam into a projection beam.

To achieve one or a portion or all of the above objectives or other objectives, the invention provides an illumination system including a light source device, a wavelength conversion device, and a light combining element. The light source device is adapted to provide a first beam. The wavelength conversion device is disposed on a transmission path of the first beam. The wavelength conversion device includes a substrate, a wavelength converting portion, and a wavelength maintaining portion. The substrate has a rotation axis. The wavelength converting portion surrounds the rotation axis of the substrate, and is adapted to receive the first beam and convert a first portion of the first beam into a second beam. The wavelength maintaining portion surrounds the rotation axis of the substrate, and is adapted to receive the first beam and guide a second portion of the first beam. A ratio of the first portion of the first beam with respect to the first beam is greater than a ratio of the second portion of the first beam with respect to the first beam. The light combining element is disposed on the transmission path of the first beam between the light source device and the wavelength conversion device. The first beam emitted from the light source device is transmitted to the wavelength conversion device by the light combining element. The light combining element is disposed on a transmission path of the second beam from the wavelength converting portion and the second portion of the first beam from the wavelength maintaining portion and adapted to combine the second portion of the first beam and the second beam.

To achieve one or a portion or all of the above objectives or other objectives, the invention provides a wavelength conversion device including a substrate, a wavelength converting portion, and a wavelength maintaining portion. The substrate has a rotation axis. The wavelength converting portion surrounds the rotation axis of the substrate, and is adapted to receive the first beam and convert a first portion of the first beam into a second beam. The wavelength maintaining portion surrounds the rotation axis of the substrate, and is adapted to receive the first beam and guide a second portion of the first beam. A ratio of the first portion of the first beam with respect to the first beam is greater than a ratio of the second portion of the first beam with respect to the first beam.

In summary, according to the illumination system of the embodiment of the invention, the wavelength conversion device includes a wavelength converting portion and a wavelength maintaining portion. In the embodiment of the invention, at the same time point, the wavelength converting portion converts the first portion of the first beam provided by the light source device into the second beams with different wavelengths, and the ratio of the first portion of the first beam with respect to the first beam is greater than the ratio of the second portion of the first beam with respect to the first beam. That is, in the embodiment of the invention, the first and second beams with different wavelengths can be simultaneously emitted by the wavelength conversion device, and in such a structural design, the number of optical elements of the illumination system can be effectively reduced, the optical path is simplified, and thus the cost is reduced. In addition, the projector of the embodiment of the invention has the advantage such as lower cost and smaller size because of the employment of the illumination system.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
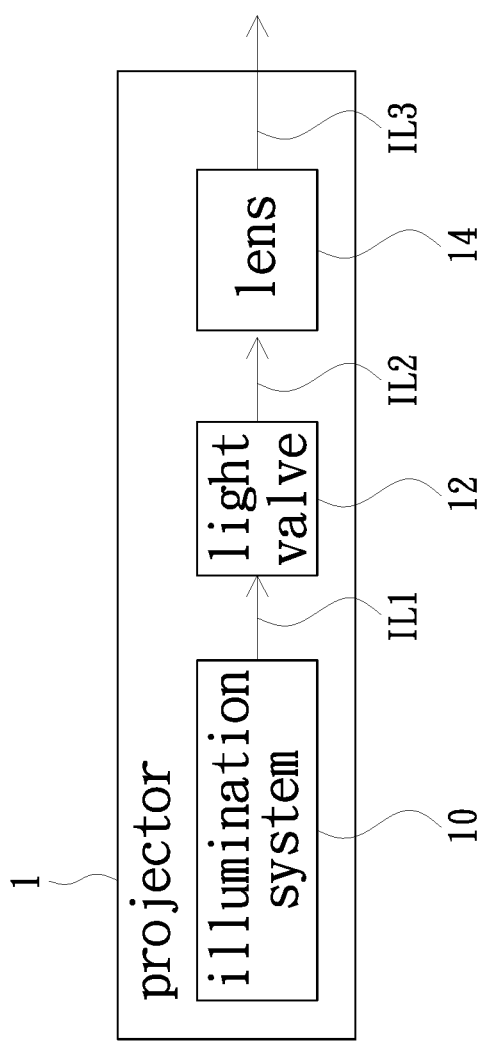
FIG. 1 is a schematic functional block diagram of a projector in accordance with an embodiment of the invention.

Referring to FIG. 1, which is a functional block diagram of a projector in accordance with an embodiment of the invention. As shown in FIG. 1, the projector 1 of the embodiment includes an illumination system 10, a light valve 12, and a lens 14. In the embodiment, the illumination system 10 is adapted to provide an illumination beam IL1. The light valve 12 is disposed/located on the transmission path of the illumination beam ILL and the light valve 12 is adapted to convert the illumination beam IL1 into an image beam IL2. In the embodiment, the light valve 12 may be a digital micromirror device (DMD), a liquid crystal on silicon (LCoS) or a liquid crystal display (LCD), but the invention is not limited thereto. The lens 14 is disposed/located on the transmission path of the image beam IL2, and the lens 14 is adapted to convert the image beam IL2 into a projection beam IL3. In the embodiment, the light valve 12 is a liquid crystal display panel for example, and the invention does not limit the number of light valves. For example, the projector 1 of the embodiment may adopt the architecture of 1-LCD or 3LCD, but the invention is not limited thereto.

The detailed structure of the illumination system 10 of the embodiment will be further described below.

Figure 2:
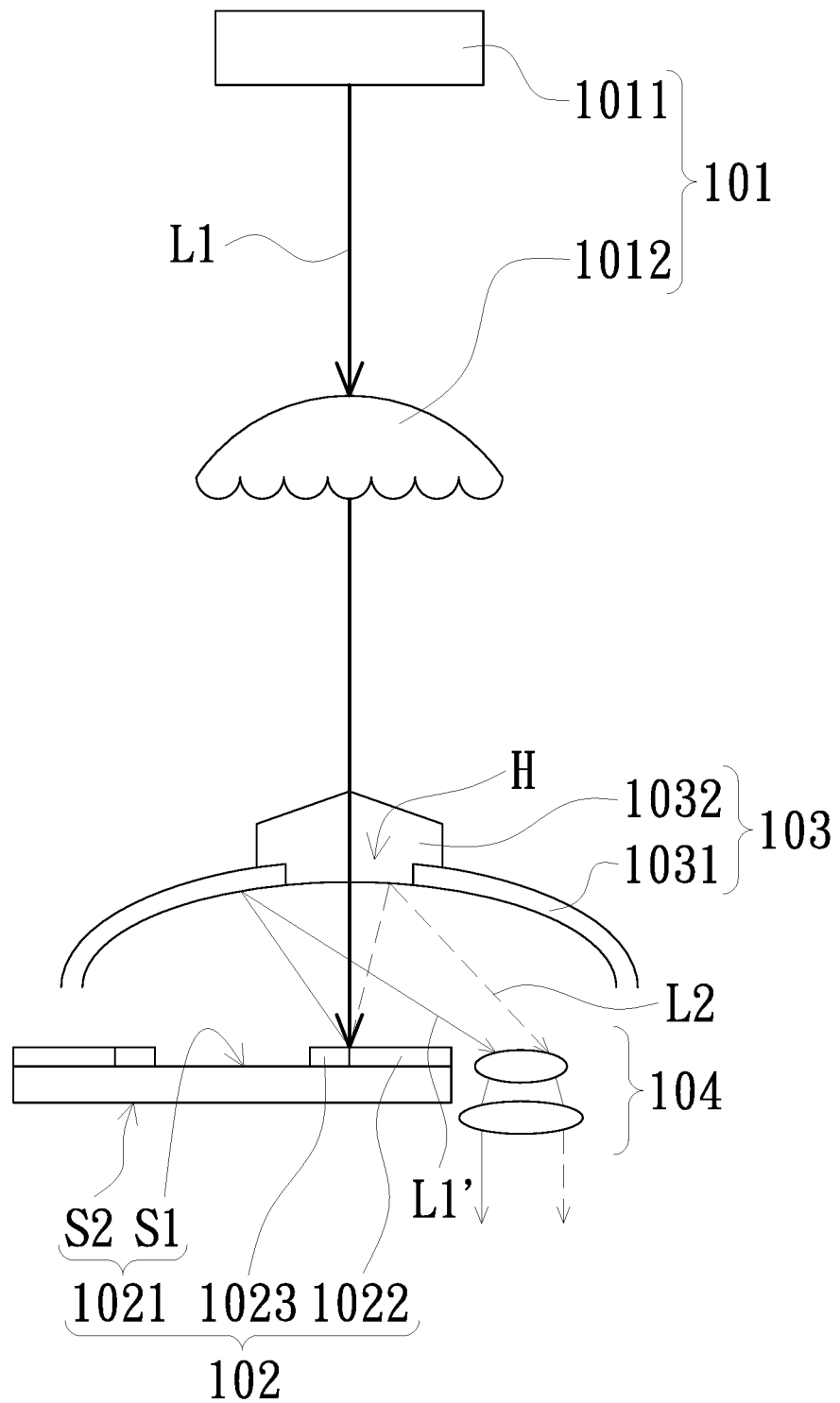
FIG. 2 is a schematic structural view of an illumination system shown in FIG. 1 in accordance with an embodiment.
Figure 3:
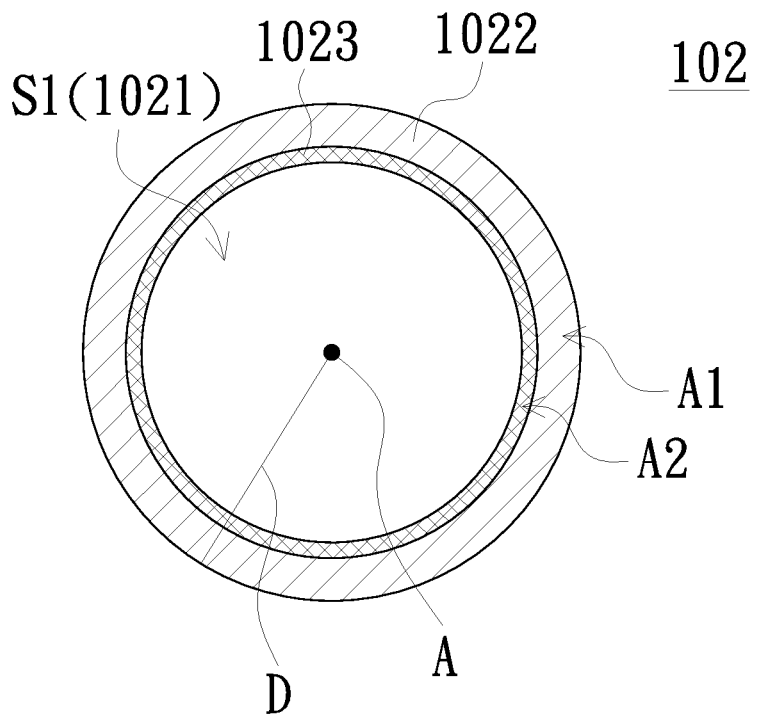
FIG. 3 is a schematic top view of a wavelength conversion device shown in FIG. 2.

Referring to FIGS. 2 and 3. FIG. 2 is a schematic structural view of an illumination system shown in FIG. 1 in accordance with an embodiment. FIG. 3 is a schematic top view of a wavelength conversion device shown in FIG. 2. As shown in FIGS. 2 and 3, the illumination system 10 of the embodiment includes a light source device 101, a wavelength conversion device 102, and a light combining element 103. The light source device 101 is adapted to provide a first beam L1. In the embodiment, the first beam L1 is a blue beam for example, and the wavelength conversion device 102 is a phosphor wheel for example, but the invention is not limited thereto. The wavelength conversion device 102 is disposed on the transmission path of the first beam L1. The light combining element 103 is disposed on the transmission path of the first beam L1 between the light source device 101 and the wavelength conversion device 102. The wavelength conversion device 102 includes a substrate 1021, a wavelength converting portion 1022, and a wavelength maintaining portion 1023. The substrate 1021 has a rotation axis A, and the substrate 1021 is rotated about the rotation axis A as a rotation center axis. The wavelength converting portion 1022 surrounds the rotation axis A of the substrate 1021 in an annular manner. In addition, in the embodiment, the rotation axis A is parallel to the transmission direction of the transmission path of the first beam L1. In the embodiment, the wavelength converting portion 1022 is adapted to receive the first beam L1 and convert a portion of the first beam L1 (for example, the first portion of the first beam L1) into a second beam L2. In the embodiment, the wavelength converting portion 1022 is, for example, a yellow phosphor coating layer, a red phosphor coating layer or a green phosphor coating layer, but the invention is not limited thereto. The wavelength maintaining portion 1023 surrounds the rotation axis A of the substrate 1021 in an annular manner. In the embodiment, the wavelength maintaining portion 1023 is adapted to receive the first beam L1 and guide another portion of the first beam L1 (for example, the second portion L1' of the first beam L1). In the embodiment, since the first beam L1 does not change the original wavelength after entering the wavelength maintaining portion 1023, the color of the second portion L1' of the first beam L1 is still blue for example, but the invention is not limited thereto. In the embodiment, the wavelength converting portion 1022 and the wavelength maintaining portion 1023 are adapted to simultaneously receive the first beam L1 emitted from the light source device 101, and the ratio of the first portion of the first beam L1 received by the wavelength converting portion 1022 with respect to the first beam L1 (the ratio of the first portion to the first beam L1) is greater/larger than the ratio of the second portion L1' of the first beam L1 received by the wavelength maintaining portion 1023 with respect to the first beam L1 (the ratio of the second portion L1' to the first beam L1). In one embodiment, the energy (in units of watt, for example) of the first portion of the first beam L1 is, for example, greater/larger than the energy of the second portion L1' of the first beam L1; in another embodiment, the light intensity (in units of lumen, for example) of the first portion of the first beam L1 is, for example, greater/larger than the light intensity of the second portion L1' of the first beam L1; and in still another embodiment, the light intensity (in units of nit, for example) of the first portion of the first beam L1 received by the wavelength conversion device 102 is, for example, greater/larger than the light intensity of the second portion L1' of the first beam L1 received by the wavelength conversion device 102. In the embodiment, the first beam L1 emitted from the light source device 101 is transmitted to the wavelength conversion device 102 by the light combining element 103, and the light combining element 103 is disposed/located on the transmission path of the second beam L2 from the wavelength converting portion 1022 and second portion L1' of the first beam L1 from the wavelength maintaining portion 1023. In the embodiment, the light combining element 103 combines the second beam L2 with the second portion L1' of the first beam L1 so that the second beam L2 and the second portion L1' of the first beam L1 form the illumination beam IL1.

As shown in FIG. 2, the light source device 101 of the embodiment includes a light emitting element 1011 and a first lens group 1012. In the embodiment, the light emitting element 1011 is, for example, a laser diode or laser diodes arranged as an array for emitting the first beam L1, but the invention does not limit the type of the light emitting element. In the embodiment, the first lens group 1012 is disposed/located between the light emitting element 1011 and the light combining element 103, and the first lens group 1012 is, for example, a lens group or a single lens having a positive refractive power, but the invention is not limited thereto. In the embodiment, the first beam L1 emitted by the light emitting element 1011 passes through the first lens group 1012, and the first beam L1 is converged and transmitted to the light combining element 103 by the first lens group 1012.

As shown in FIG. 2, the light combining element 103 of the embodiment includes a reflective portion 1031 and a dichroic portion 1032. Specifically, in the embodiment, the reflective portion 1031 is, for example, a cup-shaped reflective structure having its concave portion toward the wavelength conversion device 102. The reflective portion 1031 has a through hole H disposed/located on the transmission path of the first beam L1. The dichroic portion 1032 is, for example, a dichroic coating, and the dichroic portion 1032 is disposed in the through hole H of the reflective portion 1031. In the embodiment, the first beam L1 emitted from the light source device 101 passes through the dichroic portion 1032 and is transmitted to the wavelength conversion device 102. The first portion of the first beam L1 is converted into the second beam L2 by the wavelength converting portion 1022 and simultaneously the second portion L1' of the first beam L1 is guided by the wavelength maintaining portion 1023, and thus, the second beam L2 from the wavelength converting portion 1022 and the second portion L1' of the first beam L1 from the wavelength maintaining portion 1023 can be simultaneously transmitted to the light combining element 103. In the embodiment, the wavelength maintaining portion 1023 has a plurality of microstructures for example, and the microstructure is, for example, a light transmissive structure to guide the second portion L1' of the first beam L1 to the reflective portion 1031, but the invention is not limited thereto. In the embodiment, the main purpose of the wavelength maintaining portion 1023 having, for example, a plurality of microstructures is to allow the first beam L1 to be irradiated on the microstructures thereby generating a scattering effect while. By increasing the angle of reflection of the second portion L1' of the first beam L1 on the first surface S1 of the substrate 1021, not only the coherence of the first bean L1 is destroyed thereby avoiding the speckle but also the ratio of the of the second portion L1' of the first beam L1 transmitted to the dichroic portion 1032 of the light combining element 103 is reduced thereby reducing the loss of the second portion L1' of the first beam L1. In other embodiments, however, the wavelength maintaining portion 1023 may not have the microstructures so that the second portion L1' of the first beam L1 is transmitted to the reflective portion 1031, but the invention is not limited thereto. In the embodiment, the dichroic portion 1032 and the reflective portion 1031 of the light combining element 103 reflect the second beam L2, and the reflective portion 1031 of the light combining element 103 reflects the second portion L1' of the first beam L1.

As shown in FIG. 2, the illumination system 10 of the embodiment further includes a second lens group 104. In the embodiment, the second lens group 104 is disposed/located on the transmission path of the second portion L1' of the first beam L1 and the second beam L2. Specifically, in the embodiment, the wavelength conversion device 102 is disposed/located on the transmission path of the second portion L1' of the first beam L1 and the second beam L2 between the light combining element 103 and the second lens group 104. In the embodiment, the second lens group 104 is constituted by two lenses for example, but the invention is not limited thereto. In the embodiment, the second beam L2 reflected by the dichroic portion 1032 and the reflective portion 1031 of the light combining element 103 and the second portion L1' of the first beam L1 reflected by the reflective portion 1031 of the light combining element 103 pass through the second lens group 104, and the second portion L1' of the first beam L1 and the second beam L2 are collimated by the second lens group 104 to generally form the parallel illumination beam ILL but the invention is not limited thereto.

As shown in FIG. 2, the substrate 1021 of the wavelength conversion device 102 of the embodiment has a first surface S1 and a second surface S2, the first surface S1 of the substrate 1021 is opposite to the second surface S2, and the first surface S1 of the substrate 1021 faces the light combining element 103. In the embodiment, the wavelength converting portion 1022 and the wavelength maintaining portion 1023 both are disposed on the first surface S1 of the substrate 1021. In the embodiment, the wavelength converting portion 1022 and the wavelength maintaining portion 1023 are adapted to simultaneously receive the first beam L1 emitted from the light source device 101, and the wavelength converting portion 1022 is adapted to convert a portion of the first beam L into the second beam L2. For example, in the embodiment, the first surface S1 of the substrate 1021 is a surface having a high reflectivity for example, the wavelength converting portion 1022 disposed on the first surface S1 converts the first portion of the first beam L1 from the light source device 101 into the second beam L2, the first surface S1 of the substrate 1021 reflects the second beam L2 to the light combining element 103, and the wavelength maintaining portion 1023 disposed on the first surface S1 allows the second portion L1' of the first beam L1 from the light source device 101 to be reflected by the first surface S1 of the substrate 1021 to the light combining element 103.

In the embodiment as shown in FIGS. 2 and 3, the wavelength converting portion 1022 and the wavelength maintaining portion 1023 of the wavelength conversion device 102 are arranged concentrically along the radial direction D from the rotation axis A of the substrate 1021 for example, the wavelength converting portion 1022 is connected to the wavelength maintaining portion 1023, and the wavelength maintaining portion 1023 is disposed/located between the rotation axis A of the substrate 1021 and the wavelength converting portion 1022. In the embodiment, the area of the wavelength converting portion 1022 of the wavelength conversion device 102 is A1 for example, the area of the wavelength maintaining portion 1023 is A2 for example, and the ratio relationship equation between the area of the wavelength converting portion 1022 and the area of the wavelength maintaining portion 1023 satisfies: $A1/(A1+A2)>A2/(A1+A2)$, so that the ratio of the first portion of the first beam L1 received by the wavelength converting portion 1022 with respect to the first beam L1 is greater/larger than the ratio of the second portion L1' of the first beam L1 received by the wavelength maintaining portion 1023 with respect to the first beam L1. For example, in an embodiment, the percentage range of the first portion of the first beam L1 received by the wavelength converting portion 1022 with respect to the first beam L1 is, for example, greater/larger than or equal to 65% and smaller than or equal to 95%; that is, greater/larger than or equal to 65% and smaller than or equal to 95% of the first beam L1 is received by the wavelength converting portion 1022 and converted into the second beam L2, and the wavelength maintaining portion 1023 receives only greater/larger than or equal to 5% and smaller than or equal to 35% of the first beam L1 for example, but the invention is not limited thereto. In another embodiment, the ratio of the first portion of the first beam L1 received by the wavelength converting portion 1022 with respect to the first beam L1 is about 80% for example; that is, about 80% of the first beam L1 is received by the wavelength converting portion 1022 and converted into the second beam L2, and the wavelength maintaining portion 1023 receives, for example, about 20% of the first beam L1, but the invention is not limited thereto.

Further, in addition the ratio between the energy/light intensity of the second beam L2 and the energy/light intensity of the second portion L1' of the first beam L1 may be achieved by the ratio between the area of the wavelength converting portion 1022 and the area of the wavelength maintaining portion 1023 in the above embodiment, the effect of converting 65% to 95% of the first beam L1 into the second beam L2 may be achieved by using the thickness of the wavelength converting portion 1022 or the concentration of the phosphor in the wavelength converting portion 1022 in one embodiment, but the invention is not limited thereto.

Figure 4:
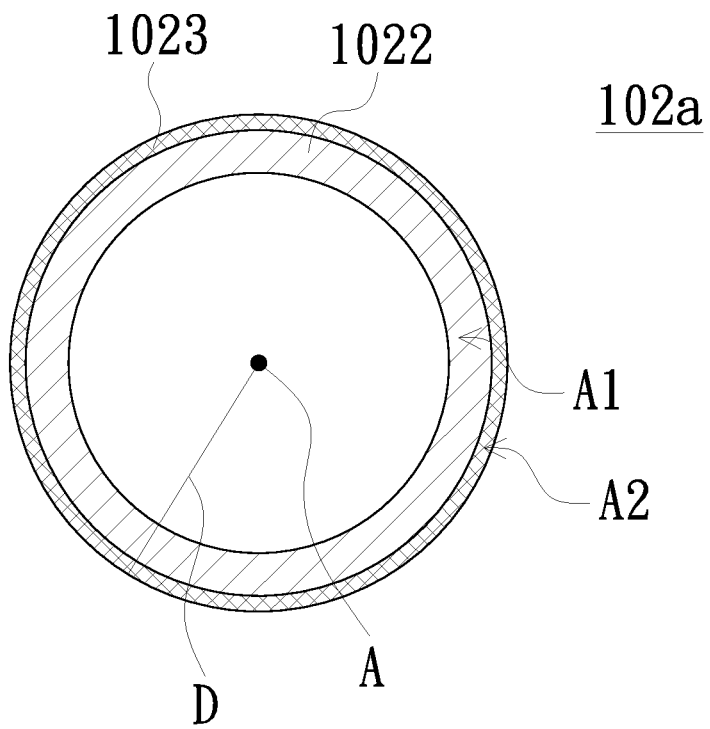
FIG. 4 is a schematic top view of a wavelength conversion device in accordance with another embodiment of the invention.

FIG. 4 is a schematic top view of a wavelength conversion device in accordance with another embodiment of the invention. As shown in FIG. 4, the wavelength conversion device 102a of the embodiment is similar to the wavelength conversion device 102 shown in FIG. 2 or FIG. 3, and the main difference is: in the wavelength conversion device 102a of the embodiment, the wavelength converting portion 1022 is disposed/located between the rotation axis A of the substrate 1021 and the wavelength maintaining portion 1023. In the structural design of the wavelength conversion device 102a of the embodiment, the result of different ratio of the first beam L1 (for example, 80% of the first portion of the first beam L1 and 20% of the second portion L1' of the first beam L1) is also achieved by the ratio of the beams received by the wavelength converting portion 1022 and the wavelength maintaining portion 1023 at the same time point.

Figure 5:
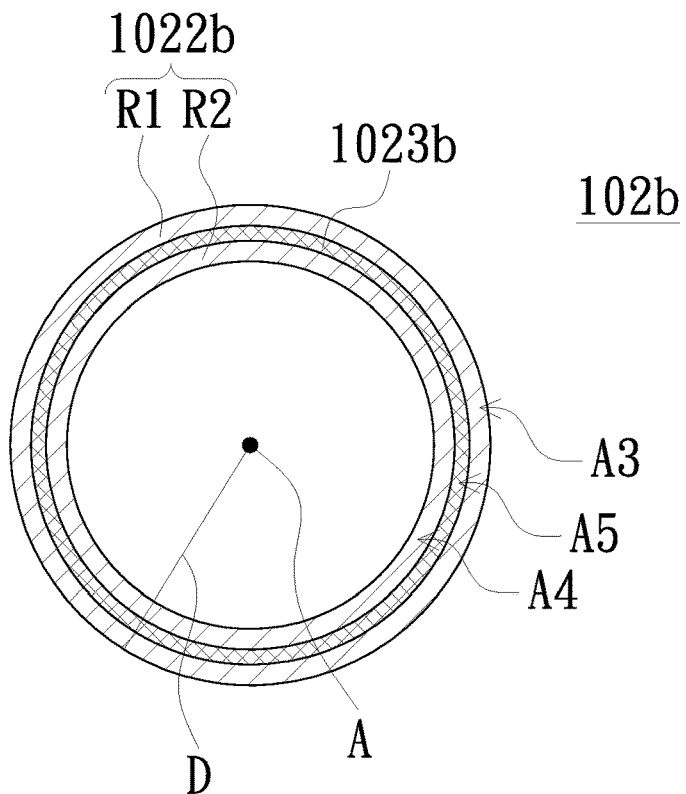
FIG. 5 is a schematic top view of a wavelength conversion device in accordance with another embodiment of the invention.

FIG. 5 is a schematic top view of a wavelength conversion device in accordance with another embodiment of the invention. As shown in FIG. 5, the wavelength conversion device 102b of the embodiment is similar to the wavelength conversion device 102 shown in FIG. 2 or FIG. 3, and the main difference is: in the wavelength conversion device 102b of the embodiment, the wavelength converting portion 1022b includes a first wavelength converting region R1 and a second wavelength converting region R2, and the wavelength maintaining portion 1023b is disposed/located between the first wavelength converting region R1 and the second wavelength converting region R2. In the embodiment, the wavelength maintaining portion 1023b is, for example, connected between the first wavelength converting region R1 and the second wavelength converting region R2. In the embodiment, the area of the first wavelength converting region R1 of the wavelength converting portion 1022b is A3 for example, the area of the second wavelength converting region R2 is A4 for example, the area of the wavelength maintaining portion 1023b is A5 for example, and the ratio relationship equation between the area of the wavelength converting portion 1022b and the area of the wavelength maintaining portion 1023b satisfies: $(A3+A4)/(A3+A4+A5) > A5/(A3+A4+A5)$. In the structural design of the wavelength conversion device 102b of the embodiment, the result of the first beams L1 with different ratios being respectively received by the wavelength converting portion 1022b and the wavelength maintaining portion 1023b at the same time point can also be achieved. In the embodiment, the wavelength maintaining portion 1023b has a plurality of microstructures for example, but the invention is not limited thereto. In other embodiments, the wavelength maintaining portion 1023b may not have the microstructures, but the invention is not limited thereto.

Figure 6:
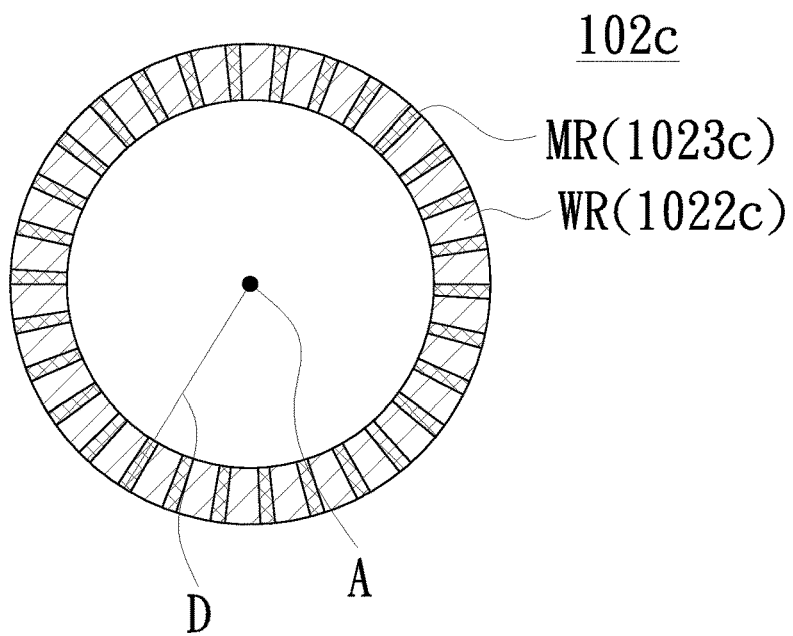
FIG. 6 is a schematic top view of a wavelength conversion device in accordance with another embodiment of the invention.

FIG. 6 is a schematic top view of a wavelength conversion device in accordance with another embodiment of the invention. As shown in FIG. 6, the wavelength conversion device 102c of the embodiment is similar to the wavelength conversion device 102 shown in FIG. 2 or FIG. 3, and the main difference is: in the wavelength conversion device 102c of the embodiment, the wavelength converting portion 1022c includes a plurality of wavelength converting regions WR, the wavelength maintaining portion 1023c include a plurality of wavelength maintaining regions MR, the wavelength converting regions WR and the wavelength maintaining regions MR are alternately arranged along the peripheral edge of the substrate 1021, and the area of each wavelength converting region WR is larger/greater than the area of each wavelength maintaining area MR for example. In the case where the area of each wavelength converting region WR is larger/greater than the area of each wavelength maintaining region MR in the embodiment, the invention does not limit the ratio between the area of each wavelength converting region and the area of each wavelength maintaining region. It is sufficient that the first beams L1 with different ratios can be respectively received by one of the wavelength converting regions WR and one of the wavelength maintaining regions MR at the same time point, and the ratio between the area of each wavelength converting region WR and the area of each wavelength maintaining region MR may vary depending on the actual situation. For example, the first beam L1 is incident on the adjacent wavelength converting region WR and the wavelength maintaining region MR at the same time, so that the first beam L1 can also be incident on the boundary between the adjacent wavelength converting region WR and the wavelength maintaining region MR, but the invention is not limited thereto. In the embodiment, the wavelength maintaining portion 1023c has a plurality of microstructures for example, but the invention is not limited thereto. In other embodiments, the wavelength maintaining portion 1023c may not have the microstructures, but the invention is not limited thereto.

Please refer to FIG. 6 continuously. In other embodiments, in the case where the area of each wavelength converting region WR is larger/greater than the area of each wavelength maintaining region MR and the ratio between the area of each wavelength converting region WR and the area of each wavelength maintaining region MR is not limited, the effect in the aforementioned embodiment can also be achieved by allowing the first beams L1 with different ratios to be rapidly (i.e., almost at the same time point) received by one of the wavelength converting regions WR and one of these wavelength maintaining regions MR sequentially, and the ratio between the area of each wavelength converting region WR and the area of each wavelength maintaining region MR may vary depending on the actual situation. For example, 80% of the first beam L1 and 20% of the first beam L1 are rapidly (i.e., almost at the same time point) incident on the adjacent wavelength converting region WR and the wavelength maintaining region MR sequentially, but the invention is not limited thereto. For example, 20% of the first beam L1 and 80% of the first beam L1 are rapidly (i.e., almost at the same time point) incident on the adjacent wavelength converting region WR and the wavelength maintaining region MR sequentially, but the invention is not limited thereto.

Figure 7:
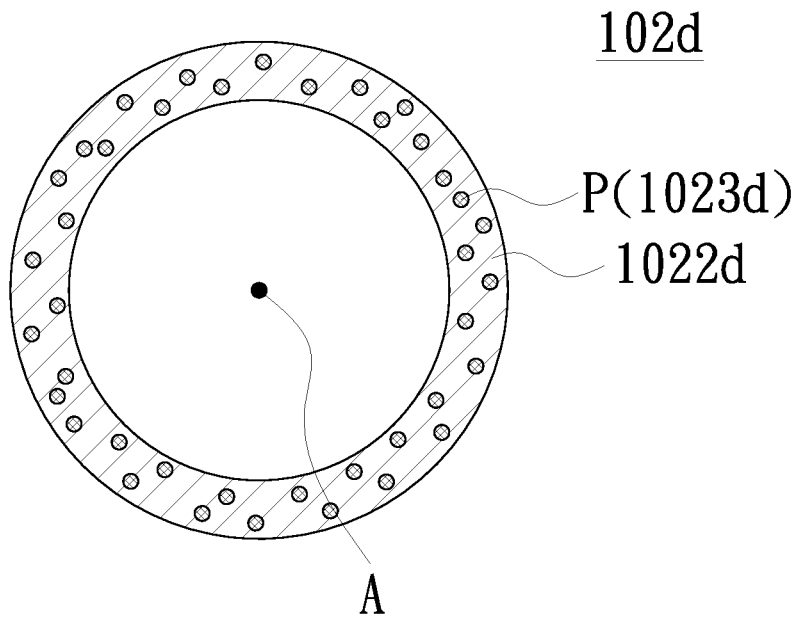
FIG. 7 is a schematic top view of a wavelength conversion device in accordance with another embodiment of the invention.

FIG. 7 is a schematic top view of a wavelength conversion device in accordance with another embodiment of the invention. As shown in FIG. 7, the wavelength conversion device 102d of the embodiment is similar to the wavelength conversion device 102 shown in FIG. 2 or FIG. 3, and the main difference is: in the wavelength conversion device 102d of the embodiment, the wavelength maintaining portion 1023d includes a plurality of dot structures P. In the embodiment, the dot structures P are distributed in the wavelength converting portion 1022d evenly, and the distribution area of the dot structures P is smaller than the distribution area of the wavelength converting portion 1022d. In the embodiment, the wavelength maintaining portion 1023d has a plurality of microstructures for example, the dot structures P of the wavelength maintaining portion 1023d are constituted by the microstructures for example, and the dot structures P are distributed evenly under the wavelength converting portion 1022d for example, that is, the wavelength converting portion 1022d is superimposed on the dot structures P for example, but the invention is not limited thereto. In other embodiments, the wavelength maintaining portion 1023d may not have the microstructures, but the invention is not limited thereto. In the structure design of the wavelength conversion device 102d of the embodiment, the result of the first beams L1 with different ratios being respectively received by the wavelength converting portion 1022d and the wavelength maintaining portion 1023d at the same time point can also be achieved.

Figure 8:
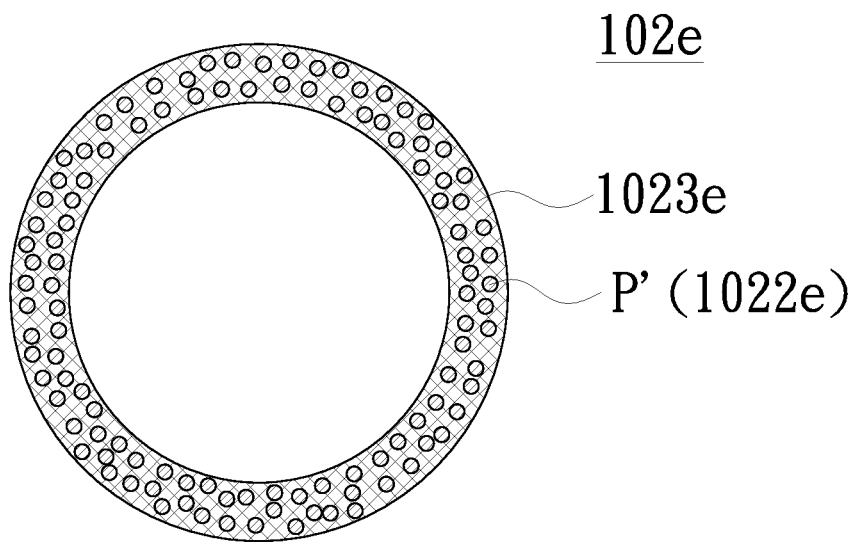
FIG. 8 is a schematic top view of a wavelength conversion device in accordance with another embodiment of the invention.

FIG. 8 is a schematic top view of a wavelength conversion device in accordance with another embodiment of the invention. As shown in FIG. 8, the wavelength conversion device 102e of the embodiment is similar to the wavelength conversion device 102 shown in FIG. 2 or FIG. 3, and the main difference is: in the wavelength conversion device 102e of the embodiment, the wavelength converting portion 1022e includes a plurality of dot structures F. In the embodiment, the dot structures P' are distributed in the wavelength maintaining portion 1023e evenly, and the distribution area of the dot structures P' is larger/greater than the distribution area of the wavelength maintaining portion 1023e. In the embodiment, the wavelength maintaining portion 1023e has a plurality of microstructures for example, and the dot structures P' are distributed evenly above the wavelength maintaining portion 1023e for example, that is, the dot structures P' are superimposed on the wavelength maintaining portion 1023e for example, but the invention is not limited thereto. In other embodiments, the wavelength maintaining portion 1023e may not have the microstructures, but the invention is not limited thereto. In the structure design of the wavelength conversion device 102e of the embodiment, the result of the first beams L1 with different ratios being respectively received by the wavelength converting portion 1022e and the wavelength maintaining portion 1023e at the same time point can also be achieved.

Figure 9:
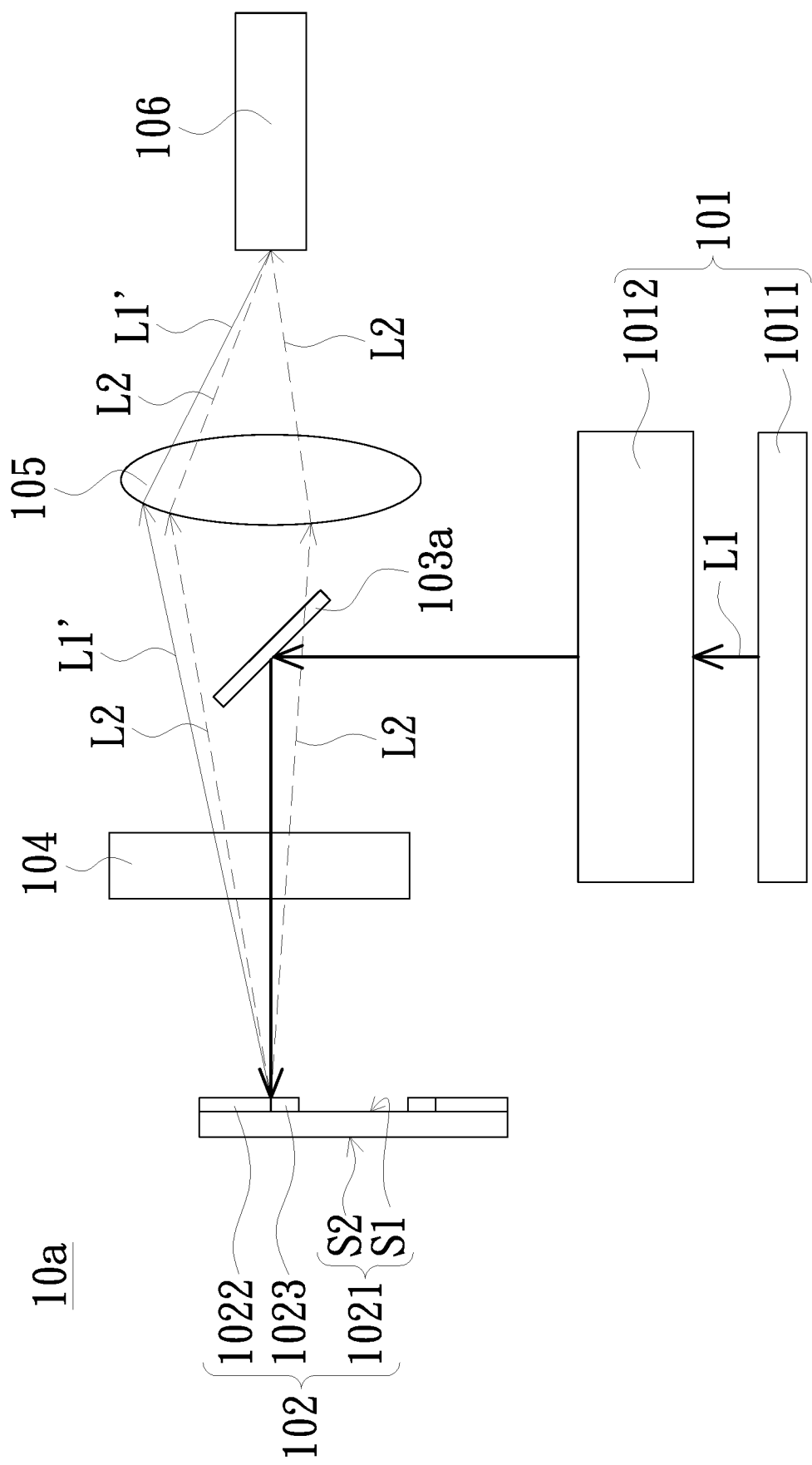
FIG. 9 is a schematic structural view of an illumination system in accordance with another embodiment of the invention.

FIG. 9 is a schematic structural view of an illumination system in accordance with another embodiment of the invention. As shown in FIG. 9, the illumination system 10a of the embodiment is similar to the illumination system 10 shown in FIG. 2, and the main difference is: in the embodiment, the illumination system 10a further includes a third lens group 105 and a light collecting element 106, the light combining element 103a is a flat-panel dichroic mirror for example, and the second lens group 104 is a lens group having a positive refractive power for example, but the invention is not limited thereto. In the embodiment, the second lens group 104 is composed of a lens or a plurality of lenses for example, but the invention is not limited thereto. In the embodiment, the light collecting element 106 is an optical rod for example, but the invention is not limited thereto. In the embodiment, the first beam L1 emitted from the light emitting element 1011 passes through the first lens group 1012, the first beam L1 is converged by the first lens group 1012 and transmitted to the light combining element 103a, and then the light combining element 103a reflects the first beam L1 to the wavelength conversion device 102. In the embodiment, the first portion of the first beam L1 is converted into the second beam L2 by the wavelength converting portion 1022 and reflected by the substrate 1021, and meanwhile the second portion L1' of the first beam L1 is reflected by the substrate 1021. In the embodiment, the wavelength maintaining portion 1023 has a plurality of microstructures for example, but the invention is not limited thereto. In other embodiments, the wavelength maintaining portion 1023 may not have the microstructures, but the invention is not limited thereto. In the embodiment, the second beam L2 from the wavelength converting portion 1022 and the second portion L1' of the first beam L1 from the wavelength maintaining portion 1023 pass through the second lens group 104 and are partially transmitted to the light combining element 103a. In the embodiment, a portion of the second beam L2 from the second lens group 104 sequentially passes through the light combining element 103a and the third lens group 105 and is transmitted to the light collecting element 106, and the remaining portion of the second beam L2 from the second lens group 104 directly passes through the third lens group 105 and is transmitted to the light collecting element 106. In the embodiment, the second portion L1' of the first beam L1 from the second lens group 104 directly passes through the third lens group 105 and is transmitted to the light collecting element 106.

Figure 10A:
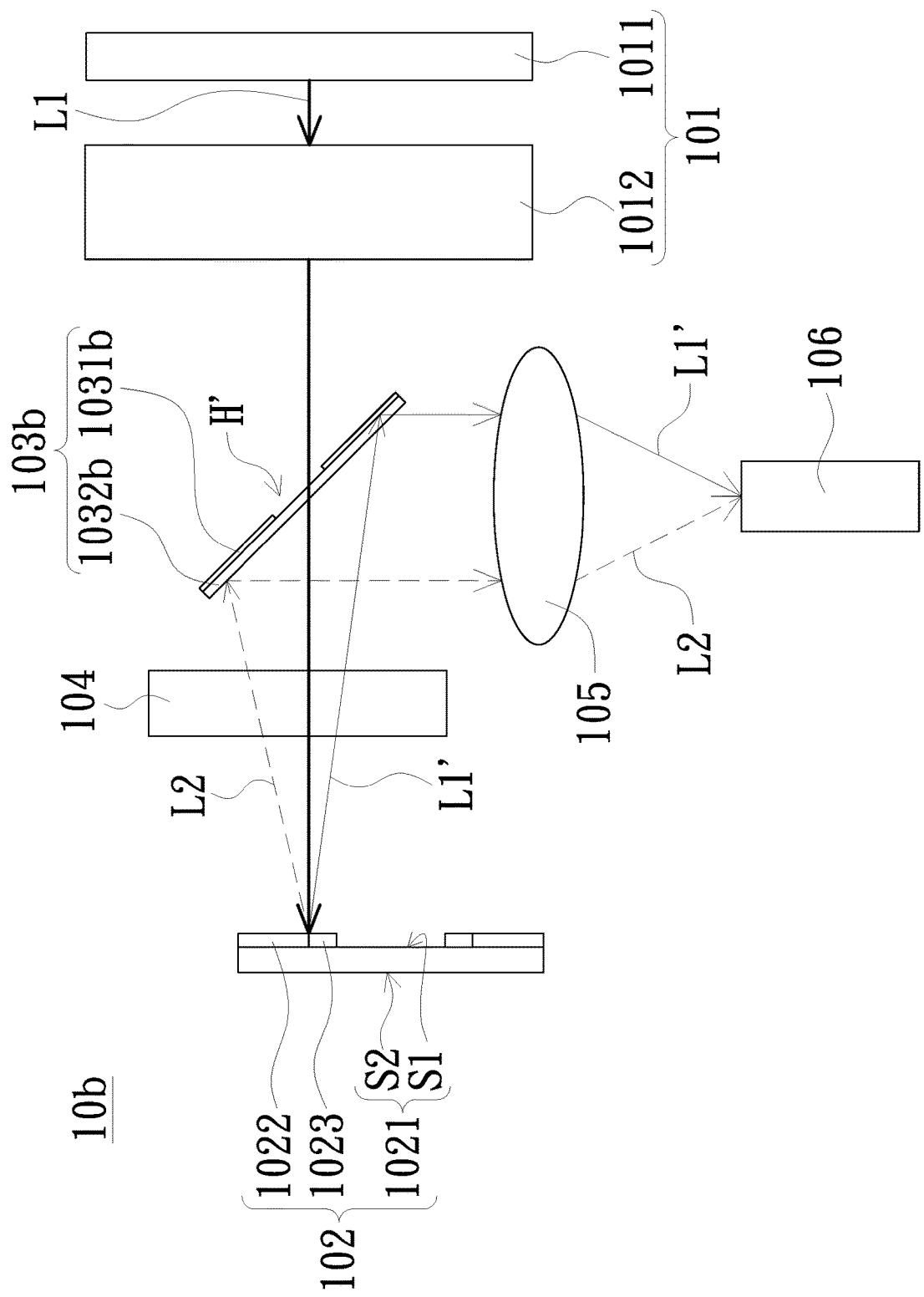
FIG. 10A is a schematic structural view of an illumination system in accordance with another embodiment of the invention.

FIG. 10A is a schematic structural view of an illumination system in accordance with another embodiment of the invention. As shown in FIG. 10A, the illumination system 10b of the embodiment is similar to the illumination system 10a shown in FIG. 9, and the main difference is: in the illumination system 10b of the embodiment, the light combining element 103b includes a reflective portion 1031b adjacent to the light source device 101 and a dichroic portion 1032b adjacent to the wavelength conversion device 102, the reflective portion 1031b and the dichroic portion 1032b are superimposed on each other, and the reflective portion 1031b of the light combining element 103b has a through hole H'. In the embodiment, the first beam L1 emitted from the light emitting element 1011 passes through the first lens group 1012, and the first beam L1 is converged (concentrated) by the first lens group 1012 having a positive refractive power, sequentially passes the through hole H' of the reflective portion 1031b and the dichroic portion 1032b of the light combining element 103b and is transmitted to the wavelength conversion device 102. In the embodiment, the first portion of the first beam L1 is converted into the second beam L2 by the wavelength converting portion 1022 and then reflected by the substrate 1021, and meanwhile the second portion L1' of the first beam L1 is, for example, scattered by the wavelength maintaining portion 1023 and then reflected by the substrate 1021. In the embodiment, the wavelength maintaining portion 1023 has a plurality of microstructures for example, but the invention is not limited thereto. In other embodiments, the wavelength maintaining portion 1023 may not have the microstructures, but the invention is not limited thereto. In the embodiment, the second beam L2 from the wavelength converting portion 1022 and the second portion L1' of the first beam L1 from the wavelength maintaining portion 1023 pass through the second lens group 104 and are transmitted to the light combining element 103b. In the embodiment, the second beam L2 is reflected by the dichroic portion 1032b of the light combining element 103b and transmitted to the third lens group 105 and the light collecting element 106, and the second portion L1' of the first beam L1 is reflected by the reflective portion 1031b of the light combining element 103b to the third lens group 105 and the light collecting element 106.

Figure 10B:
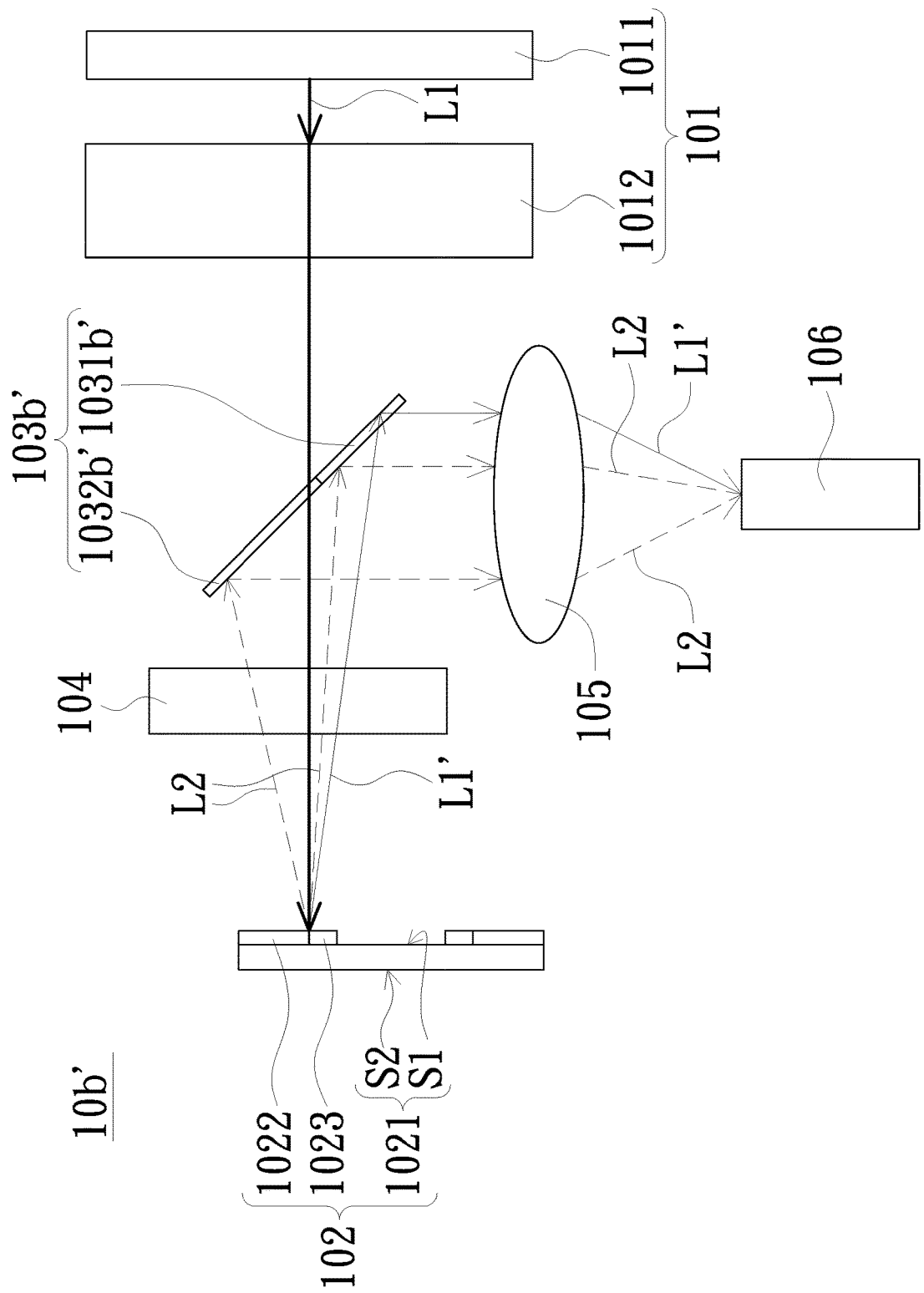
FIG. 10B is a schematic structural view of an illumination system in accordance with another embodiment of the invention.

FIG. 10B is a schematic structural view of an illumination system in accordance with another embodiment of the invention. As shown in FIG. 10B, the illumination system 10b' of the embodiment is similar to the illumination system 10b shown in FIG. 10A, and the main difference is: in the illumination system 10b' of the embodiment, the light combining element 103b' includes a reflective portion 1031b' adjacent to the light source device 101 and a dichroic portion 1032b' adjacent to the wavelength conversion device 102, and the reflective portion 1031b' and the dichroic portion 1032b' are not superimposed on each other. In the embodiment, the first beam L1 emitted from the light emitting element 1011 passes through the dichroic portion 1032b' of the light combining element 103b' and is transmitted to the wavelength conversion device 102, the first portion of the first beam L1 is converted into the second beam L2 by the wavelength converting portion 1022 and then reflected by the substrate 1021, and meanwhile the second portion L1' of the first beam L1 is, for example, scattered by the wavelength maintaining portion 1023 and then reflected by the substrate 1021. In the embodiment, the wavelength maintaining portion 1023 has a plurality of microstructures for example, but the invention is not limited thereto. In other embodiments, the wavelength maintaining portion 1023 may not have the microstructures, but the invention is not limited thereto. In the embodiment, the second beam L2 from the wavelength converting portion 1022 is reflected by the reflective portion 1031b' and the dichroic portion 1032b' of the light combining element 103b' to the third lens group 105 and the light collecting element 106, and the second portion L1' of the first beam L1 from the wavelength maintaining portion 1023 is reflected by the reflective portion 1031b' of the light combining element 103b' to the third lens group 105 and the light collecting element 106.

Figure 11:
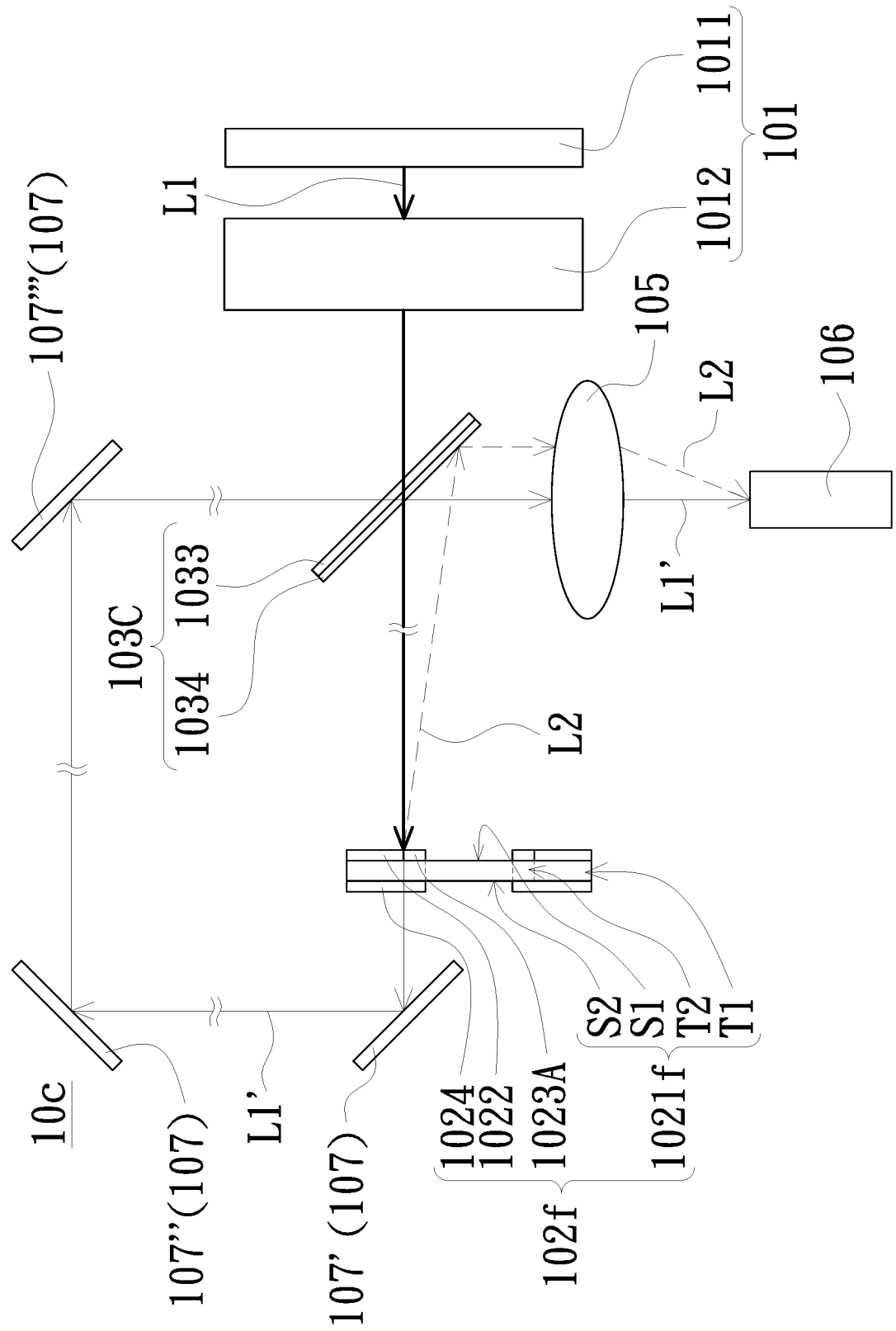
FIG. 11 is a schematic structural view of an illumination system in accordance with another embodiment of the invention.

FIG. 11 is a schematic structural view of an illumination system in accordance with another embodiment of the invention. As shown in FIG. 11, the illumination system 10c of the embodiment is similar to the illumination system 10b shown in FIG. 10A, and the main difference is: in the embodiment, and the illumination system 10c further includes a reflective element group 107, the light combining element 103 includes a light transmitting portion 1033 adjacent to the light source device 101 and a first dichroic portion 1034 adjacent to the wavelength conversion device 102c, the light transmitting portion 1033 and the first dichroic portion 1034 are superimposed on each other, the wavelength conversion device 102f further includes a second dichroic portion 1024 disposed/located on the second surface S2 of the substrate 1021f, and the substrate 1021f may be glass. In the embodiment, the wavelength maintaining portion 1023A may have a microstructure or may not have a microstructure. In the embodiment, the reflective element group 107 is constituted by three mirrors 107', 107" and 107'" for example, but the invention is not limited thereto. In the embodiment, the first beam L1 emitted from the light emitting element 1011 passes through the first lens group 1012, and the first beam L1 is converged by the first lens group 1012, sequentially passes through the light transmitting portion 1033 and the first dichroic portion 1034 of the light combining element 103C and is transmitted to the wavelength conversion device 102f. In the embodiment, the first portion of the first beam L1 is converted into the second beam L2 by the wavelength converting portion 1022 and then reflected by the second dichroic portion 1024 disposed/located on the substrate 1021f to the light combining element 103C, and meanwhile, the second portion L1' of the first beam L1 sequentially passes through the wavelength maintaining portion 1023A and the second dichroic portion 1024 and is transmitted to the mirror 107' of the reflective element group 107. In the embodiment, the second portion L1' of the first beam L1 from the wavelength maintaining portion 1023A passes through the second dichroic portion 1024, is transmitted to the reflective element group 107, and is sequentially reflected by the mirrors 107', 107" and 107'" of the reflective element group 107 to the light combining element 103C, and then sequentially passes through the light transmitting portion 1033 and the first dichroic portion 1034 of the light combining element 103C and is transmitted to the third lens group 105 and the light collecting element 106. On the other hand, the second beam L2 from the wavelength converting portion 1022 is reflected by the first dichroic portion 1034 of the light combining element 103C to the third lens group 105 and the light collecting element 106. In the embodiment, the substrate 1021f of the wavelength conversion device 102f has a first penetrating region T1 and a second penetrating region T2, and the wavelength converting portion 1022 and the wavelength maintaining portion 1023A are disposed in the first penetrating region T1 and the second penetrating region T2 of the substrate 1021f respectively, so that the first portion of the first beam L1 is converted into the second beam L2 by the wavelength converting portion 1022 and then penetrates the first penetrating region T1 of the substrate 1021f to the second dichroic portion 1024, and the second portion L1' of the first beam L1 penetrates the wavelength maintaining portion 1023A and the second penetrating region T2 of the substrate 1021f. However, in other embodiments, the position on the second surface S2 of the substrate 1021f corresponding to the second penetrating region T2 may not be disposed with the second dichroic portion 1024, so that the second portion L1' of the first beam L1 can be directly incident on the reflective element group 107 without passing through the second dichroic portion 1024 after penetrating the wavelength maintaining portion 1023A and the second penetrating region T2 of the substrate 1021f, but the invention is not limited thereto.

Figure 12:
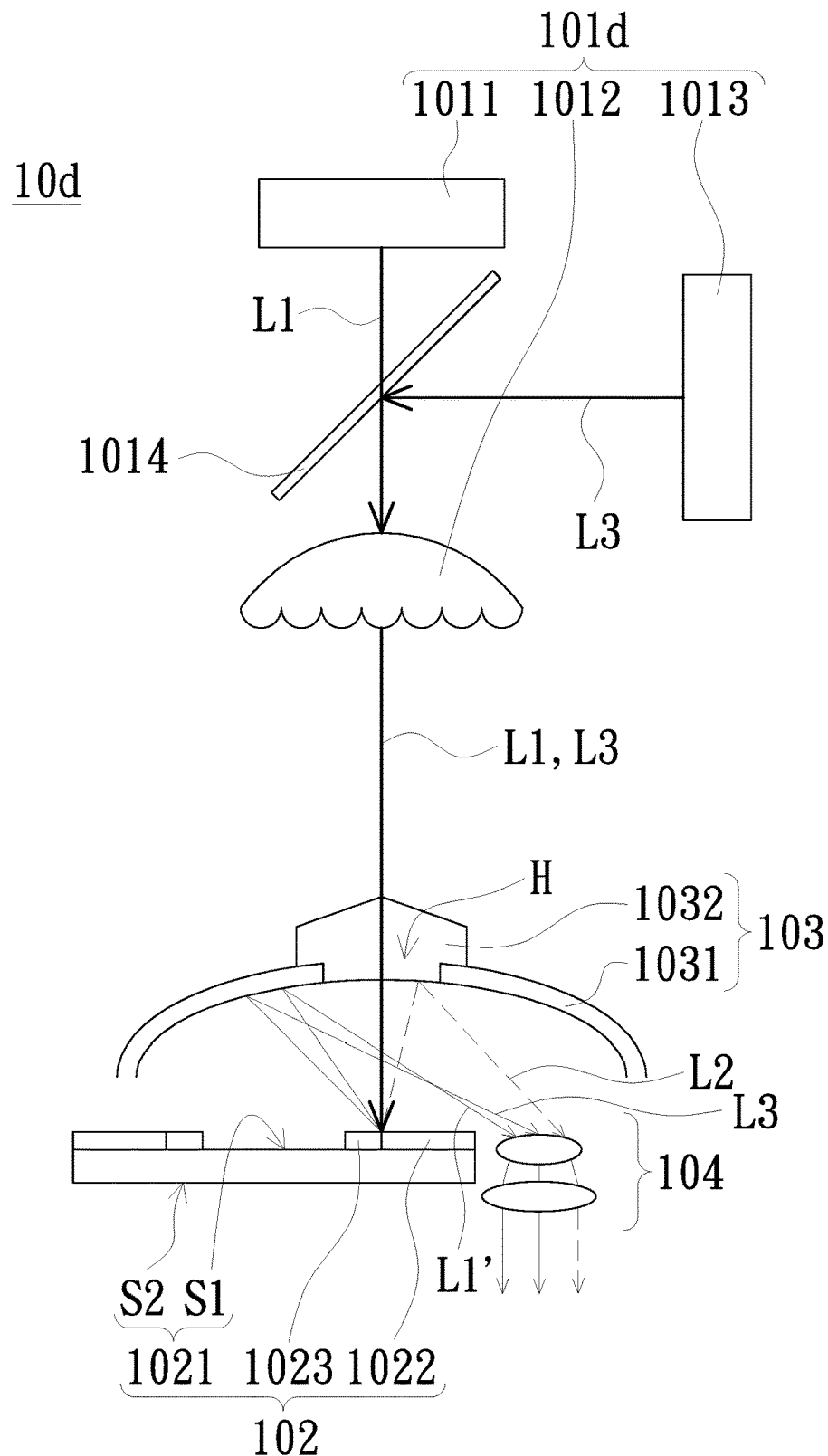
FIG. 12 is a schematic structural view of an illumination system in accordance with another embodiment of the invention.

FIG. 12 is a schematic structural view of an illumination system in accordance with another embodiment of the invention. As shown in FIG. 12, the illumination system 10d of the embodiment is similar to the illumination system 10 shown in FIG. 2, and the main difference is: in the embodiment, the illumination system 10d further includes a dichroic mirror 1014, and the light source device 101d further includes an auxiliary light emitting element 1013. In the embodiment, the dichroic mirror 1014 is disposed/located between the light emitting element 1011 and the first lens group 1012, and the light emitting element 1011 and the auxiliary light emitting element 1013 are disposed/located on the two opposite sides of the dichroic mirror 1014 respectively for example. In the embodiment, the auxiliary light emitting element 1013 is adapted to provide a third beam L3. In the embodiment, the first beam L1 provided by the light emitting element 1011 is a blue beam for example, and the third beam L3 provided by the auxiliary light emitting element 1013 is a red beam for example, but the invention does not limit the color or spectral range of the third beam provided by the auxiliary light emitting element. In an embodiment, the auxiliary light emitting element 1013 may also provide a beam having the same color as the first beam L1 for example. In the embodiment, the third beam L3 emitted from the auxiliary light emitting element 1013 is reflected by the dichroic mirror 1014, passes through the first lens group 1012 and is sequentially transmitted to the light combining element 103, the wavelength conversion device 102 and the second lens group 104. In the embodiment, the effect of the auxiliary light emitting element 1013 is to improve the color quality of the color light of the first beam L1 and/or the second beam L2, thereby improving the image quality of the projector.

In summary, according to the illumination system of the embodiment of the invention, the wavelength conversion device includes a wavelength converting portion and a wavelength maintaining portion. In the embodiment of the invention, at the same time point, the wavelength converting portion converts the first portion of the first beam provided by the light source device into the second beams with different wavelengths, and the ratio of the first portion of the first beam with respect to the first beam is greater/larger than the ratio of the second portion of the first beam with respect to the first beam. That is, in the embodiment of the invention, the first and second beams with different wavelengths can be simultaneously emitted by the wavelength conversion device, and in such a structural design, the number of optical elements of the illumination system can be effectively reduced, the optical path is simplified, and thus the cost is reduced. In addition, the projector of the embodiment of the invention has the advantage such as lower cost and smaller size because of the employment of the illumination system.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projector, comprising:
    an illumination system, comprising:
        a light source device, adapted to provide a first beam;
        a wavelength conversion device, disposed on a transmission path of the first beam, wherein the wavelength conversion device comprises:
            a substrate, having a rotation axis;
            a wavelength converting portion, surrounding the rotation axis of the substrate, adapted to receive the first beam, and adapted to convert a first portion of the first beam into a second beam, and having an area of A1; and
            a wavelength maintaining portion, surrounding the rotation axis of the substrate, adapted to receive the first beam, and adapted to guide a second portion of the first beam, wherein a ratio of the first portion of the first beam with respect to the first beam is greater than a ratio of the second portion of the first beam with respect to the first beam, and having an area of A2, wherein A1/(A1+A2)>A2/(A1+A2); and
        wherein the wavelength converting portion comprises a first wavelength converting region and a second wavelength converting region, the wavelength maintaining portion is connected between the first wavelength converting region and the second wavelength converting region, an area of the first wavelength converting region is A3, an area of the second wavelength converting region is A4, and (A3+A4)/(A2+A3+A4)>A2/(A2+A3+A4);
        a light combining element, disposed on the transmission path of the first beam between the light source device and the wavelength conversion device, wherein the first beam emitted from the light source device is transmitted to the wavelength conversion device by the light combining element, the light combining element is disposed on a transmission path of the second beam from the wavelength converting portion and the second portion of the first beam from the wavelength maintaining portion, so that the second portion of the first beam and the second beam form an illumination beam;
        a light valve, disposed on a transmission path of the illumination beam, and adapted to convert the illumination beam into an image beam; and
        a lens, disposed on a transmission path of the image beam, and adapted to convert the image beam into a projection beam.

2. The projector according to claim 1, wherein the wavelength converting portion and the wavelength maintaining portion are adapted to simultaneously receive the first beam.

3. The projector according to claim 1, wherein the substrate has a first surface and a second surface, the first surface is opposite to the second surface, the first surface faces the light combining element, the wavelength converting portion and the wavelength maintaining portion are disposed on the first surface of the substrate, and the first surface is adapted to reflect the second portion of the first beam.

4. The projector according to claim 1, wherein the substrate has a first penetrating region and a second penetrating region, the wavelength converting portion and the wavelength maintaining portion are disposed on the first penetrating region and the second penetrating region respectively, and the wavelength maintaining portion is adapted to allow the second portion of the first beam to pass through.

5. The projector according to claim 1, wherein the wavelength converting portion and the wavelength maintaining portion are arranged concentrically along a radial direction of the substrate from the rotation axis of the substrate.

6. The projector according to claim 1, wherein the wavelength converting portion is connected to the wavelength maintaining portion, and the wavelength maintaining portion is disposed between the rotation axis of the substrate and the wavelength converting portion.

7. The projector according to claim 1, wherein the wavelength converting portion is connected to the wavelength maintaining portion, and the wavelength converting portion is disposed between the rotation axis of the substrate and the wavelength maintaining portion.

8. The projector according to claim 1, wherein the wavelength maintaining portion comprises a plurality of dot structures, the dot structures are distributed in the wavelength converting portion, and a distribution area of the dot structures of the wavelength maintaining portion is smaller than a distribution area of the wavelength converting portion.

9. The projector according to claim 1, wherein the wavelength converting portion comprises a plurality of dot structures, the dot structures are distributed in the wavelength maintaining portion, and a distribution area of the dot structures of the wavelength converting portion is greater than a distribution area of the wavelength maintaining portion.

10. The projector according to claim 1, wherein the wavelength converting portion comprises a plurality of wavelength converting regions, the wavelength maintaining portion comprises a plurality of wavelength maintaining regions, the wavelength converting regions and the wavelength maintaining regions are arranged alternately with each other along a peripheral edge of the substrate, and an area of each of the wavelength converting regions is greater than an area of each of the wavelength maintaining regions.

11. The projector according to claim 1, wherein a percentage range of the first beam received by the wavelength converting portion is greater than or equal to 65% and smaller than or equal to 95%, and a percentage range of the first beam received by the wavelength maintaining portion and not converted by the wavelength maintaining portion is greater than or equal to 5% and smaller than or equal to 35%.

12. The projector according to claim 1, wherein the light source device comprises a light emitting element and a first lens group, the light emitting element is adapted to emit the first beam, the first lens group is disposed between the light emitting element and the light combining element, and the first beam passes through the first lens group and is transmitted to the light combining element.

13. The projector according to claim 1, wherein the illumination system further comprises a second lens group, the second lens group is disposed on a transmission path of the second beam and the second portion of the first beam, and the second lens group is disposed between the light combining element and the wavelength conversion device.

14. The projector according to claim 1, wherein the light combining element comprises a dichroic portion and a reflective portion, the first beam emitted from the light source device passes through the dichroic portion and is transmitted to the wavelength conversion device, the second beam from the wavelength converting portion and the second portion of the first beam from the wavelength maintaining portion are transmitted to the light combining element, the dichroic portion reflects the second beam, and the reflective portion reflects the second portion of the first beam.

15. The projector according to claim 1, wherein the light combining element comprises a reflective portion adjacent to the light source device and a dichroic portion adjacent to the wavelength conversion device, the reflective portion has a through hole, the first beam emitted from the light source device passes through the through hole of the reflective portion and the dichroic portion and is transmitted to the wavelength conversion device, the second beam from the wavelength converting portion and the second portion of the first beam from the wavelength maintaining portion are transmitted to the light combining element, the dichroic portion reflects the second beam, and the reflective portion reflects the second portion of the first beam.

16. A projector, comprising:
an illumination system, comprising:
a light source device, adapted to provide a first beam;
a wavelength conversion device, disposed on a transmission path of the first beam, wherein the wavelength conversion device comprises:
a substrate, having a rotation axis;
a wavelength converting portion, surrounding the rotation axis of the substrate, adapted to receive the first beam, and adapted to convert a first portion of the first beam into a second beam; and
a wavelength maintaining portion, surrounding the rotation axis of the substrate, adapted to receive the first beam, and adapted to guide a second portion of the first beam, wherein a ratio of the first portion of the first beam with respect to the first beam is greater than a ratio of the second portion of the first beam with respect to the first beam; and a light combining element, disposed on the transmission path of the first beam between the light source device and the wavelength conversion device, wherein the first beam emitted from the light source device is transmitted to the wavelength conversion device by the light combining element, the light combining element is disposed on a transmission path of the second beam from the wavelength converting portion and the second portion of the first beam from the wavelength maintaining portion, so that the second portion of the first beam and the second beam form an illumination beam; and a reflective element group, the reflective element group is disposed on a transmission path of the second portion of the first beam, the light combining element comprises a light transmitting portion adjacent to the light source device and a first dichroic portion adjacent to the wavelength conversion device, the wavelength conversion device further comprises a second dichroic portion disposed on the second surface of the substrate, the first beam emitted from the light source device passes through the light transmitting portion and the first dichroic portion and is transmitted to the wavelength conversion device, the second beam from the wavelength converting portion is reflected by the second dichroic portion to the light combining element, the second portion of the first beam from the wavelength maintaining portion passes through the second dichroic portion and is transmitted to the reflective element group, the reflective element group reflects the second portion of the first beam to the light combining element, and the second portion of the first beam passes through the light transmitting portion and the first dichroic portion;

a light valve, disposed on a transmission path of the illumination beam, and adapted to convert the illumination beam into an image beam; and a lens, disposed on a transmission path of the image beam, and adapted to convert the image beam into a projection beam.

17. An illumination system, comprising:
a light source device, adapted to provide a first beam;
a wavelength conversion device, disposed on a transmission path of the first beam, wherein the wavelength conversion device comprises:
a substrate, having a rotation axis;
a wavelength converting portion, surrounding the rotation axis of the substrate, adapted to receive the first beam, and adapted to convert a first portion of the first beam into a second beam, and having an area of A1; and
a wavelength maintaining portion, surrounding the rotation axis of the substrate, adapted to receive the first beam, and adapted to guide a second portion of the first beam, wherein a ratio of the first portion of the first beam with respect to the first beam is greater than a ratio of the second portion of the first beam with respect to the first beam, and having an area of A2, wherein $A1/(A1+A2) > A2/(A1+A2)$; and
wherein the wavelength converting portion comprises a first wavelength converting region and a second wavelength converting region, the wavelength maintaining portion is connected between the first wavelength converting region and the second wavelength converting region, an area of the first wavelength converting region is A3, an area of the second wavelength converting region is A4, and (A3+A4)/(A2+A3+A4)>A2/(A2+A3+A4);

a light combining element, disposed on the transmission path of the first beam between the light source device and the wavelength conversion device, wherein the first beam emitted from the light source device is transmitted to the wavelength conversion device by the light combining element, the light combining element is disposed on a transmission path of the second beam from the wavelength converting portion and the second portion of the first beam from the wavelength maintaining portion and adapted to combine the second portion of the first beam and the second beam.

18. The illumination system according to claim 17, wherein the wavelength converting portion and the wavelength maintaining portion are adapted to simultaneously receive the first beam.

19. The illumination system according to claim 17, wherein the substrate has a first surface and a second surface, the first surface is opposite to the second surface, the first surface faces the light combining element, the wavelength converting portion and the wavelength maintaining portion are disposed on the first surface of the substrate, and the first surface is adapted to reflect the second portion of the first beam.

20. The illumination system according to claim 17, wherein the substrate has a first penetrating region and a second penetrating region, the wavelength converting portion and the wavelength maintaining portion are disposed on the first penetrating region and the second penetrating region respectively, and the wavelength maintaining portion is adapted to allow the second portion of the first beam to pass through.

21. The illumination system according to claim 17, wherein the wavelength converting portion and the wavelength maintaining portion are arranged concentrically along a radial direction of the substrate from the rotation axis of the substrate.

22. The illumination system according to claim 17, wherein the wavelength converting portion is connected to the wavelength maintaining portion, and the wavelength maintaining portion is disposed between the rotation axis of the substrate and the wavelength converting portion.

23. The illumination system according to claim 17, wherein the wavelength converting portion is connected to the wavelength maintaining portion, and the wavelength converting portion is disposed between the rotation axis of the substrate and the wavelength maintaining portion.

24. The illumination system according to claim 17, wherein the wavelength maintaining portion comprises a plurality of dot structures, the dot structures are distributed in the wavelength converting portion, and a distribution area of the dot structures of the wavelength maintaining portion is smaller than a distribution area of the wavelength converting portion.

25. The illumination system according to claim 17, wherein the wavelength converting portion comprises a plurality of dot structures, the dot structures are distributed in the wavelength maintaining portion, and a distribution area of the dot structures of the wavelength converting portion is greater than a distribution area of the wavelength maintaining portion.

26. The illumination system according to claim 17, wherein the wavelength converting portion comprises a plurality of wavelength converting regions, the wavelength maintaining portion comprises a plurality of wavelength maintaining regions, the wavelength converting regions and the wavelength maintaining regions are arranged alternately with each other along a peripheral edge of the substrate, and an area of each of the wavelength converting regions is greater than an area of each of the wavelength maintaining regions.

27. The illumination system according to claim 17, wherein a percentage range of the first beam received by the wavelength converting portion is greater than or equal to 65% and smaller than or equal to 95%, and a percentage range of the first beam received by the wavelength maintaining portion and not converted by the wavelength maintaining portion is greater than or equal to 5% and smaller than or equal to 35%.

28. The illumination system according to claim 17, wherein the light source device comprises a light emitting element and a first lens group, the light emitting element is adapted to emit the first beam, the first lens group is disposed between the light emitting element and the light combining element, and the first beam passes through the first lens group and is transmitted to the light combining element.

29. The illumination system according to claim 17, further comprising a second lens group, wherein the second lens group is disposed on a transmission path of the second beam and the second portion of the first beam, and the second lens group is disposed between the light combining element and the wavelength conversion device.

30. The illumination system according to claim 17, wherein the light combining element comprises a dichroic portion and a reflective portion, the first beam emitted from the light source device passes through the dichroic portion and is transmitted to the wavelength conversion device, the second beam from the wavelength converting portion and the second portion of the first beam from the wavelength maintaining portion are transmitted to the light combining element, the dichroic portion reflects the second beam, and the reflective portion reflects the second portion of the first beam.

31. The illumination system according to claim 17, wherein the light combining element comprises a reflective portion adjacent to the light source device and a dichroic portion adjacent to the wavelength conversion device, the reflective portion has a through hole, the first beam emitted from the light source device passes through the through hole of the reflective portion and the dichroic portion and is transmitted to the wavelength conversion device, the second beam from the wavelength converting portion and the second portion of the first beam from the wavelength maintaining portion are transmitted to the light combining element, the dichroic portion reflects the second beam, and the reflective portion reflects the second portion of the first beam.

32. An illumination system, comprising:
a light source device, adapted to provide a first beam;
a wavelength conversion device, disposed on a transmission path of the first beam, wherein the wavelength conversion device comprises:
a substrate, having a rotation axis;
a wavelength converting portion, surrounding the rotation axis of the substrate, adapted to receive the first beam, and adapted to convert a first portion of the first beam into a second beam; and a wavelength maintaining portion, surrounding the rotation axis of the substrate, adapted to receive the first beam, and adapted to guide a second portion of the first beam, wherein a ratio of the first portion of the first beam with respect to the first beam is greater than a ratio of the second portion of the first beam with respect to the first beam;

a light combining element, disposed on the transmission path of the first beam between the light source device and the wavelength conversion device, wherein the first beam emitted from the light source device is transmitted to the wavelength conversion device by the light combining element, the light combining element is disposed on a transmission path of the second beam from the wavelength converting portion and the second portion of the first beam from the wavelength maintaining portion and adapted to combine the second portion of the first beam and the second beam; and a reflective element group, wherein the reflective element group is disposed on a transmission path of the second portion of the first beam, the light combining element comprises a light transmitting portion adjacent to the light source device and a first dichroic portion adjacent to the wavelength conversion device, the wavelength conversion device further comprises a second dichroic portion disposed on the second surface of the substrate, the first beam emitted from the light source device passes through the light transmitting portion and the first dichroic portion and is transmitted to the wavelength conversion device, the second beam from the wavelength converting portion is reflected by the first dichroic portion to the light combining element, the second portion of the first beam from the wavelength maintaining portion passes through the second dichroic portion and is transmitted to the reflective element group, the reflective element group reflects the second portion of the first beam to the light combining element, and the second portion of the first beam passes through the light transmitting portion and the first dichroic portion.

33. A wavelength conversion device, comprising:
a substrate, having a rotation axis;
a wavelength converting portion, surrounding the rotation axis of the substrate, adapted to receive a first beam, and adapted to convert a first portion of the first beam into a second beam, and having an area of A1; and
a wavelength maintaining portion, surrounding the rotation axis of the substrate, adapted to receive the first beam, and adapted to guide a second portion of the first beam, wherein a ratio of the first portion of the first beam with respect to the first beam is greater than a ratio of the second portion of the first beam with respect to the first beam, and having an area of A2, wherein $A1/(A1+A2) > A2/(A1+A2)$;
wherein the wavelength converting portion comprises a first wavelength converting region and a second wavelength converting region, the wavelength maintaining portion is connected between the first wavelength converting region and the second wavelength converting region, an area of the first wavelength converting region is A3, an area of the second wavelength converting region is A4, and $(A3+A4)/(A2+A3+A4) > A2/(A2+A3+A4)$.

34. The wavelength conversion device according to claim 33, wherein the wavelength converting portion and the wavelength maintaining portion are adapted to simultaneously receive the first beam.

35. The wavelength conversion device according to claim 33, wherein the substrate has a first surface and a second surface, the first surface is opposite to the second surface, the first surface faces the light combining element, the wavelength converting portion and the wavelength maintaining portion are disposed on the first surface of the substrate, and the first surface is adapted to reflect the second portion of the first beam.

36. The wavelength conversion device according to claim 33, wherein the substrate has a first penetrating region and a second penetrating region, the wavelength converting portion and the wavelength maintaining portion are disposed on the first penetrating region and the second penetrating region respectively, and the wavelength maintaining portion is adapted to allow the second portion of the first beam to pass through.

37. The wavelength conversion device according to claim 33, wherein the wavelength converting portion and the wavelength maintaining portion are arranged concentrically along a radial direction of the substrate from the rotation axis of the substrate.

38. The wavelength conversion device according to claim 33, wherein the wavelength converting portion is connected to the wavelength maintaining portion, and the wavelength maintaining portion is disposed between the rotation axis of the substrate and the wavelength converting portion.

39. The wavelength conversion device according to claim 33, wherein the wavelength converting portion is connected to the wavelength maintaining portion, and the wavelength converting portion is disposed between the rotation axis of the substrate and the wavelength maintaining portion.

40. The wavelength conversion device according to claim 33, wherein the wavelength converting portion comprises a plurality of wavelength converting regions, the wavelength maintaining portion comprises a plurality of wavelength maintaining regions, the wavelength converting regions and the wavelength maintaining regions are arranged alternately with each other along a peripheral edge of the substrate, and an area of each of the wavelength converting regions is greater than an area of each of the wavelength maintaining regions.

41. A wavelength conversion device, comprising:
a substrate, having a rotation axis;
a wavelength converting portion, surrounding the rotation axis of the substrate, adapted to receive a first beam, and adapted to convert a first portion of the first beam into a second beam, and having an area of A1; and
a wavelength maintaining portion, surrounding the rotation axis of the substrate, adapted to receive the first beam, and adapted to guide a second portion of the first beam, wherein a ratio of the first portion of the first beam with respect to the first beam is greater than a ratio of the second portion of the first beam with respect to the first beam, and having an area of A2, wherein $A1/(A1+A2) > A2/(A1+A2)$, wherein the wavelength maintaining portion comprises a plurality of dot structures, the dot structures are distributed in the wavelength converting portion, and a distribution area of the dot structures of the wavelength maintaining portion is smaller than a distribution area of the wavelength converting portion.

42. A wavelength conversion device, comprising:
a substrate, having a rotation axis;
a wavelength converting portion, surrounding the rotation axis of the substrate, adapted to receive a first beam, and adapted to convert a first portion of the first beam into a second beam, and having an area of A1; and a wavelength maintaining portion, surrounding the rotation axis of the substrate, adapted to receive the first beam, and adapted to guide a second portion of the first beam, wherein a ratio of the first portion of the first beam with respect to the first beam is greater than a ratio of the second portion of the first beam with respect to the first beam, and having an area of A2, wherein A1/(A1+A2)>A2/(A1+A2), wherein the wavelength converting portion comprises a plurality of dot structures, the dot structures are distributed in the wavelength maintaining portion, and a distribution area of the dot structures of the wavelength converting portion is greater than a distribution area of the wavelength maintaining portion.

43. A wavelength conversion device, comprising:
a substrate, having a rotation axis;
a wavelength converting portion, surrounding the rotation axis of the substrate, adapted to receive a first beam, and adapted to convert a first portion of the first beam into a second beam, and having an area of A1; and
a wavelength maintaining portion, surrounding the rotation axis of the substrate, adapted to receive the first beam, and adapted to guide a second portion of the first beam, wherein a ratio of the first portion of the first beam with respect to the first beam is greater than a ratio of the second portion of the first beam with respect to the first beam, and having an area of A2, wherein A1/(A1+A2)>A2/(A1+A2), and
wherein a percentage range of the first beam received by the wavelength converting portion is greater than or equal to 65% and smaller than or equal to 95%, and a percentage range of the first beam received by the wavelength maintaining portion and not converted by the wavelength maintaining portion is greater than or equal to 5% and smaller than or equal to 35%.

* * * * *